United States Patent

Lian

(10) Patent No.: US 9,904,445 B2
(45) Date of Patent: Feb. 27, 2018

(54) METHOD FOR ADAPTIVELY INVOKING APPLICATIONS AND ELECTRONIC APPARATUS USING THE SAME

(71) Applicant: Acer Incorporated, New Taipei (TW)

(72) Inventor: Han-Wen Lian, New Taipei (TW)

(73) Assignee: Acer Incorporated, New Taipei (TW)

( * ) Notice: Subject to any disclaimer, the term of this patent is extended or adjusted under 35 U.S.C. 154(b) by 514 days.

(21) Appl. No.: 14/597,225

(22) Filed: Jan. 15, 2015

(65) Prior Publication Data

US 2016/0162159 A1 Jun. 9, 2016

(30) Foreign Application Priority Data

Dec. 5, 2014 (TW) .............................. 103142429 A

(51) Int. Cl.
*G06F 3/0484* (2013.01)
*G06F 17/30* (2006.01)
*G06F 9/445* (2018.01)

(52) U.S. Cl.
CPC ...... *G06F 3/04842* (2013.01); *G06F 9/44505* (2013.01); *G06F 17/30899* (2013.01)

(58) Field of Classification Search
CPC .... G06F 17/30; G06F 3/0484; G06F 3/04842; G06F 9/44505
See application file for complete search history.

(56) References Cited

U.S. PATENT DOCUMENTS

2012/0290974 A1* 11/2012 Doig ................... G06F 17/3089
715/808
2013/0254714 A1* 9/2013 Shin ....................... G06F 3/0482
715/810

FOREIGN PATENT DOCUMENTS

CN  104091125  10/2014
TW  201407458  2/2014

OTHER PUBLICATIONS

ITWalker, "How to change default apps for Android," with English translation thereof, Feb. 21, 2011, available at : http://walker-a.com/archives/740.

* cited by examiner

*Primary Examiner* — Andrea Leggett
(74) *Attorney, Agent, or Firm* — JCIPRNET

(57) ABSTRACT

A method for adaptively invoking applications and electronic apparatus using the same are provided. The method includes the following steps: establishing a database recording a plurality of data combinations, wherein a first data combination among the data combinations correspond to a first application, a first object, and a second application invoked by the electronic apparatus in response to a first action applied to the first object included in the first application; controlling the user interface unit to receive a second action applied to the second object when the user interface unit displays the first application including the second object; and accessing the database, and invoking the second application according to the first data combination when the second object and the second action respectively correspond to the first object and the first action.

14 Claims, 12 Drawing Sheets

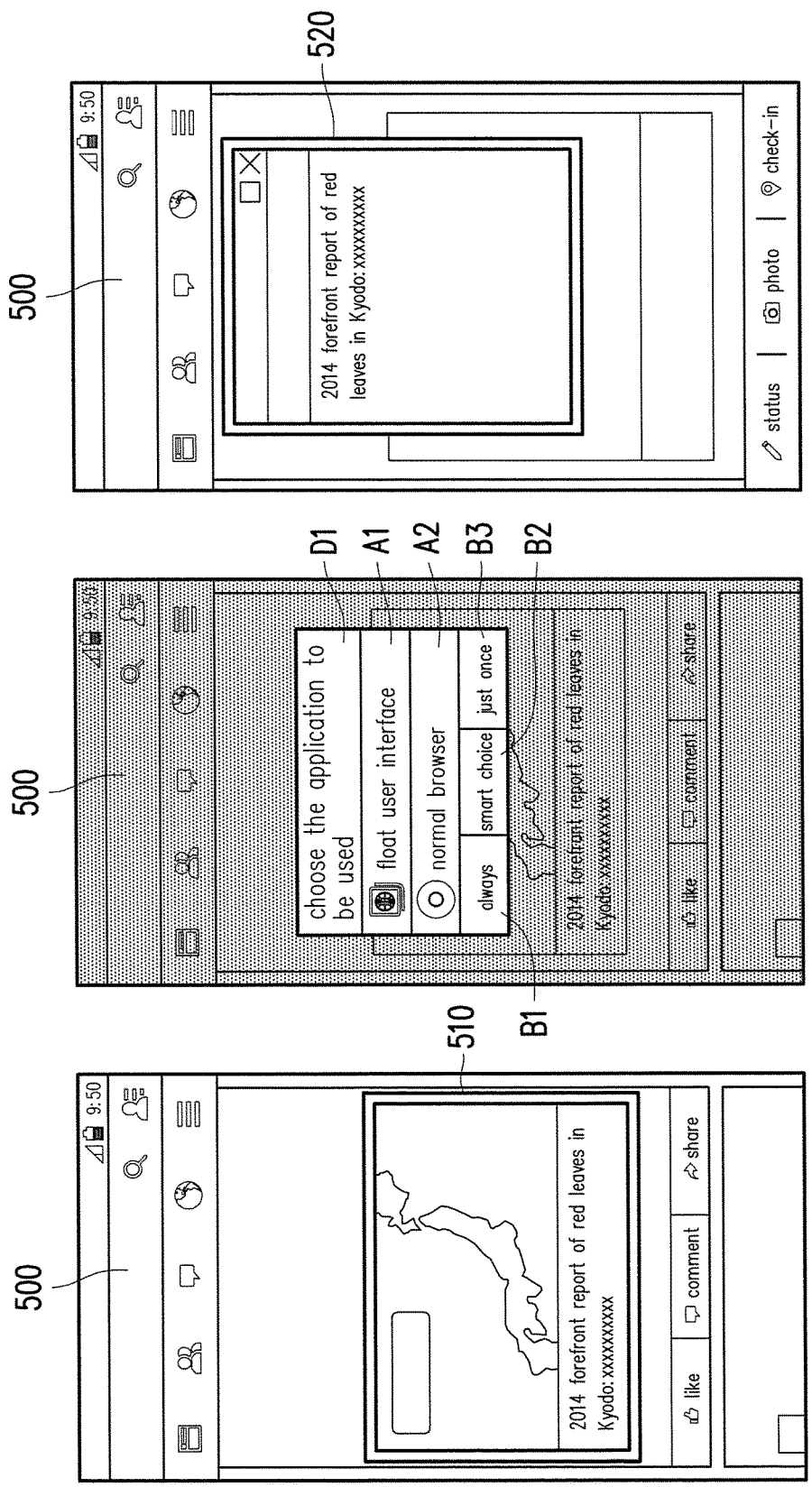

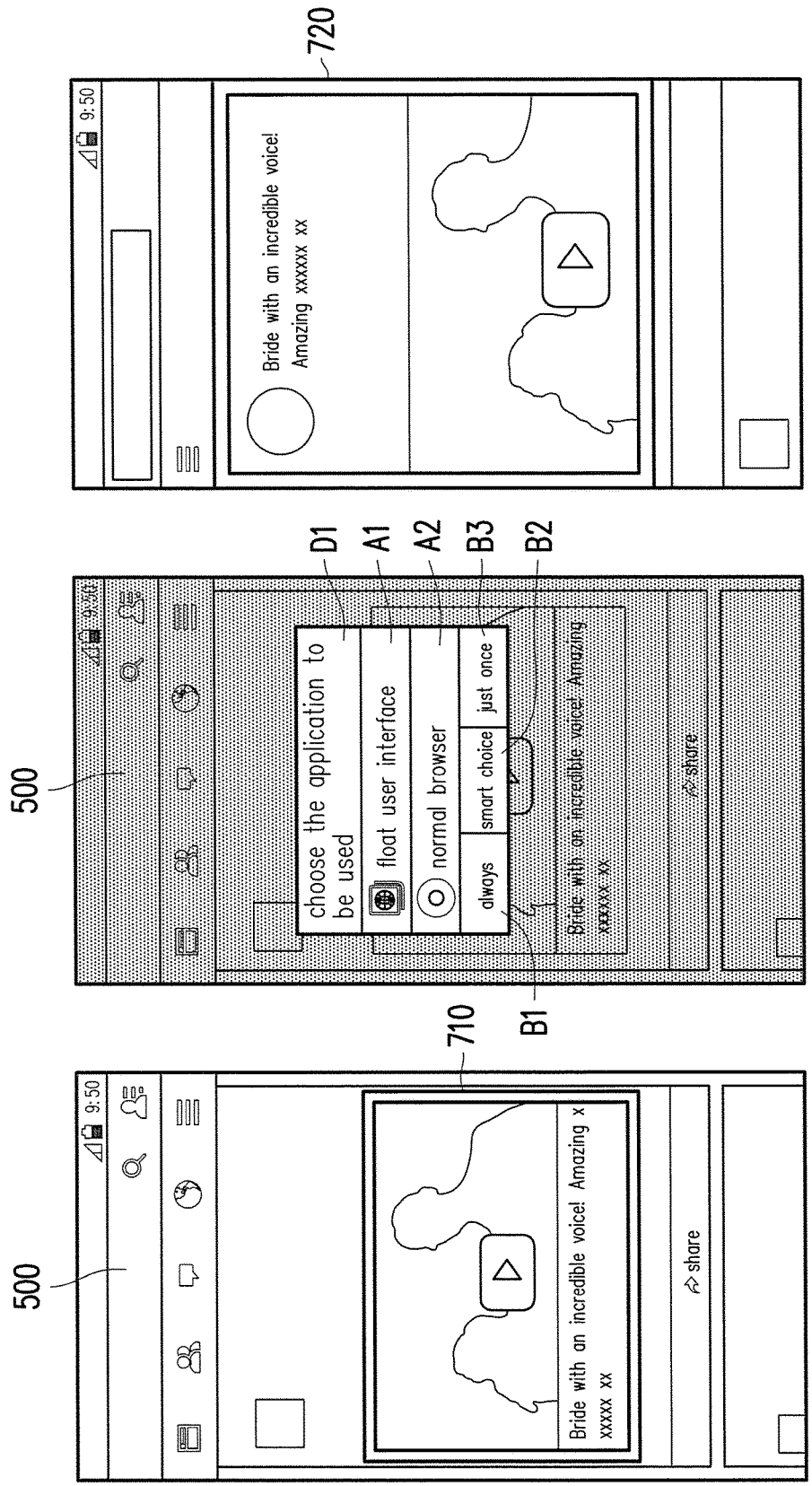

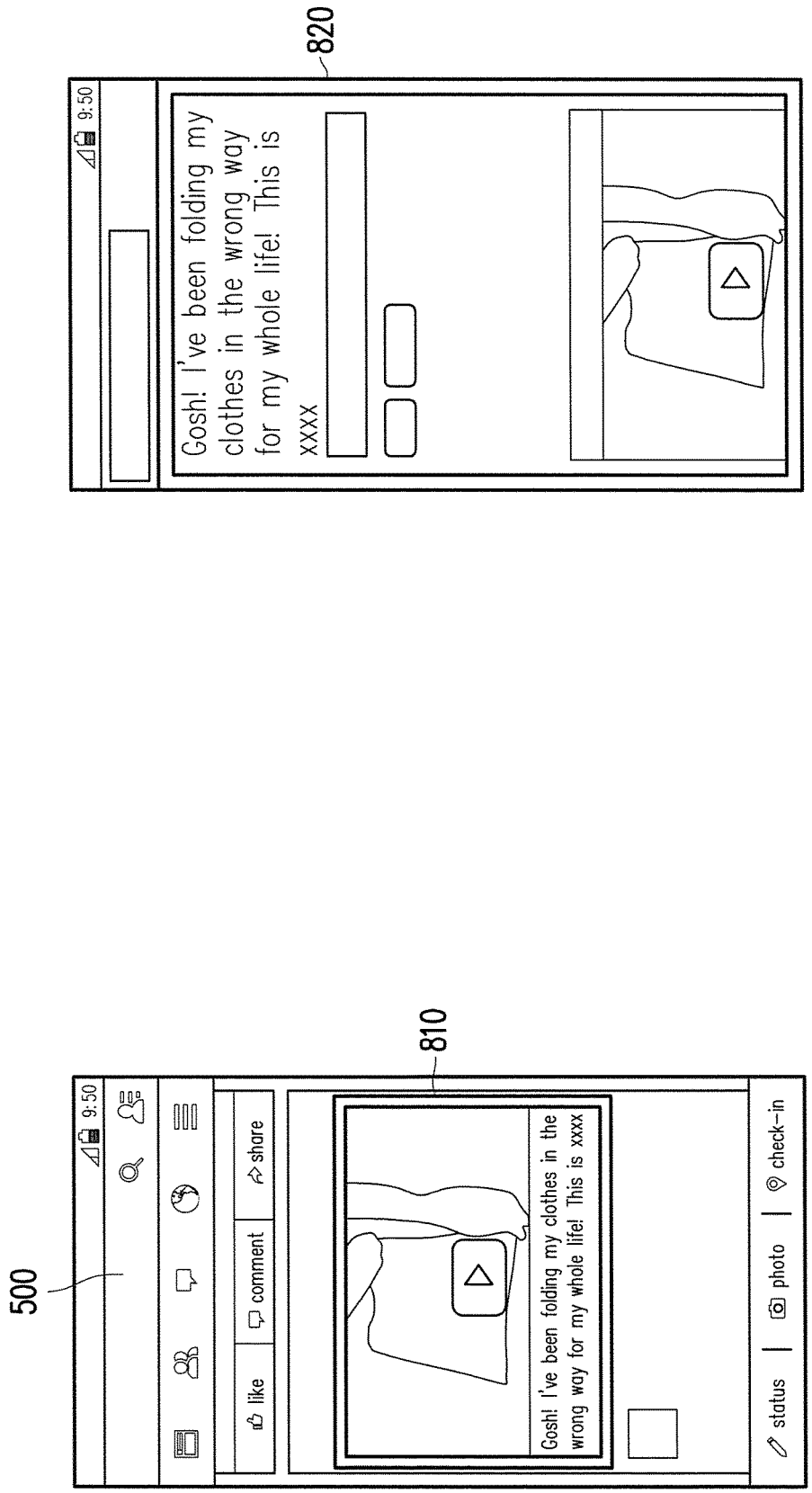

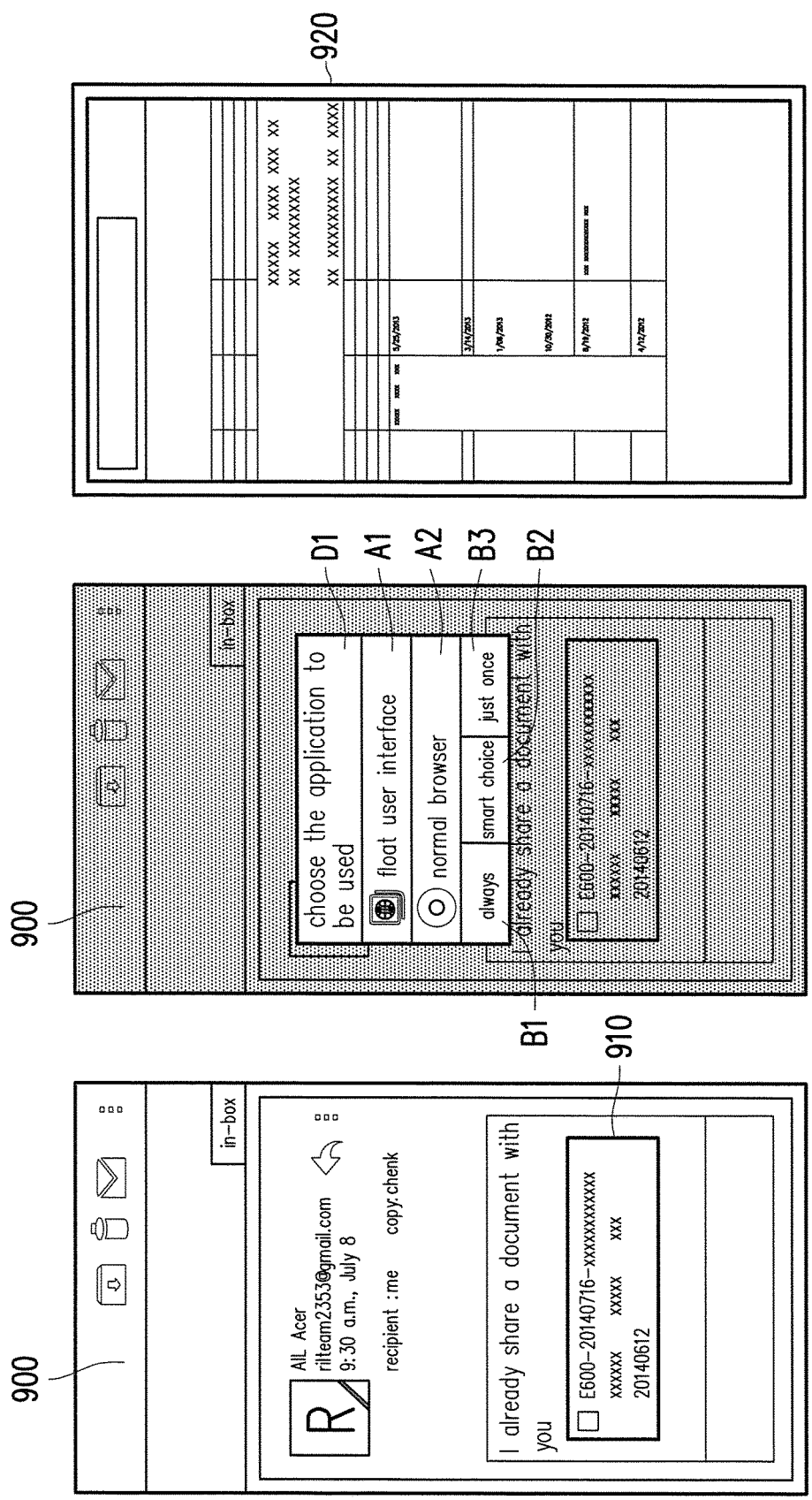

METHOD FOR ADAPTIVELY INVOKING APPLICATIONS AND ELECTRONIC APPARATUS USING THE SAME

CROSS-REFERENCE TO RELATED APPLICATION

This application claims the priority benefit of Taiwan application serial no. 103142429, filed on Dec. 5, 2014. The entirety of the above-mentioned patent application is hereby incorporated by reference herein and made a part of this specification.

BACKGROUND OF THE INVENTION

1. Field of the Invention

The invention relates to a method for starting applications and an electronic apparatus using the same, and particularly relates to a method for adaptively invoking applications and an electronic apparatus using the same.

2. Description of Related Art

In the modern society, smart electronic apparatuses such as smart phones, personal digital assistants (PDAs), and tablet computers have now become an indispensable part of our daily lives. To allow the users to more easily switch between different applications, there are already many smart electronic apparatuses compatible with the function of float user interface (float UI).

Referring to FIGS. 1A and 1B, FIGS. 1A and 1B are schematic views illustrating using a conventional float user interface. When the user intends to open an object (i.e., external link) in an application 100 of an electronic apparatus, the electronic apparatus may directly display contents of the object 110 in a form of a float user interface 120 (e.g., window). In other words, the electronic apparatus saves processes of switching the application 100 to the background, invoking an additional application (e.g., the float user interface 120) to display an operation of the object 110. Also, when the user intends to turn off the float user interface 120, the user only needs to click "X" at the upper right corner to turn off the float user interface 120. Then, the user may proceed to use the application 100 again.

Referring to FIG. 2, FIG. 2 is a schematic view illustrating an inquiry dialog box when an electronic apparatus starts other applications. In the conventional technology, before systems (e.g., Android or iOS systems) of some electronic apparatuses open an external link, these electronic apparatuses are set in default to actively show an inquiry dialog box 200 (including applications 212 to 214 and execution options 221 to 222) for the user to choose an application to open the external link. When the user chooses the application 214 and the execution option 221, the electronic apparatus may directly use the application 214 to open the external link hereinafter without displaying the inquiry dialog box 200 again.

While such mechanism saves the trouble of repetitive inquiries, it also significantly reduces the chance of using the float user interface 120 afterwards, making the float user interface 120 unable to function as expected. Besides, when the user intends to use other applications to open the external link, it is difficult for the user to make such a change. However, if the electronic apparatus displays the inquiry dialog box 200 every time when the external link is to be opened, the user may find the operation rather inconvenient and not intuitive.

SUMMARY OF THE INVENTION

Thus, the invention provides a method for adaptive invoking applications and an electronic apparatus using the same capable of invoking suitable applications according to different operating scenarios.

The invention provides a method for adaptive invoking applications and an electronic apparatus using the same. The method includes steps as follows: establishing a database recording a plurality of data combinations, wherein a first data combination of the data combinations corresponds to a first application, a first object, and a second application invoked by the electronic apparatus in response to a first action applied to the first object when the user interface unit displays the first application including the first object; controlling the user interface unit to receive a second action applied to the second object when the user interface unit displays the first application including a second object; and accessing the database and invoking the second application according to the first data combination when the second object and the second action respectively correspond to the first object and the first action.

The invention provides an electronic apparatus, including a user interface unit, a storage unit, and a processing unit. The storage unit stores a plurality of modules. The processing unit is coupled to the user interface unit and the storage unit, and accesses and executes the modules stored in the storage unit. The module includes an establishing module, a control module, and an invoking module. The establishing module establishes a database recording a plurality of data combinations. A first data combination of the data combinations corresponds to a first application, a first object, and a second application invoked by the electronic apparatus in response to a first action applied to the first object when the user interface unit displays the first application including the first object. The control module controls the user interface unit to receive a second action applied to the second object when the user interface unit displays the first application including a second object. The invoking module accesses the database and invokes the second application according to the first data combination when the second object and the second action respectively correspond to the first object and the first action.

Based on the above, the method for adaptively invoking the applications and the electronic apparatus using the same according to the embodiments of the invention are capable of establishing the data combinations corresponding to different operating scenarios in the database and recording the second applications that the user intends to use in the respective operating scenarios. Afterwards, when an operating scenario occurs again, the electronic apparatus may automatically invoke the corresponding second application.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 5A to 5C are schematic views illustrating an electronic apparatus executing applications according to an embodiment of the invention.

FIGS. 7A to 7C are schematic views illustrating an electronic apparatus executing applications according to an embodiment of the invention.

FIGS. 8A to 8B are schematic views illustrating an electronic apparatus executing applications according to an embodiment of the invention.

FIGS. 9A to 9C are schematic views illustrating an electronic apparatus executing applications according to an embodiment of the invention.

DESCRIPTION OF THE EMBODIMENTS

Figure 1B:
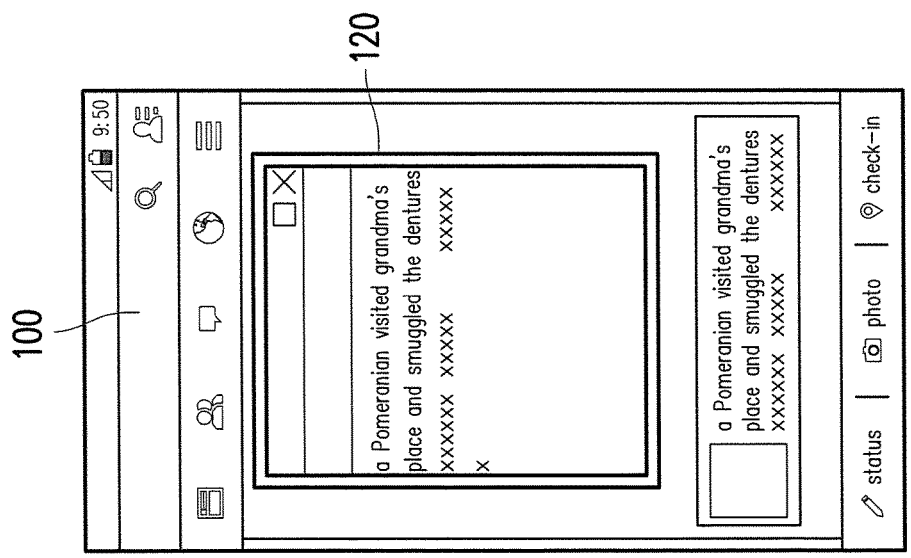
FIGS. 1A and 1B are schematic views illustrating using a conventional float user interface.
Figure 1A:
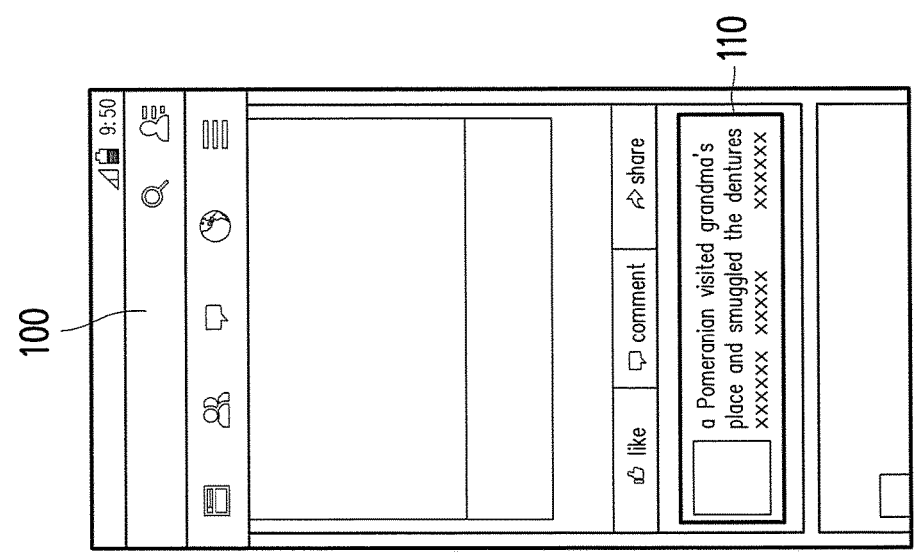
Figure 2:
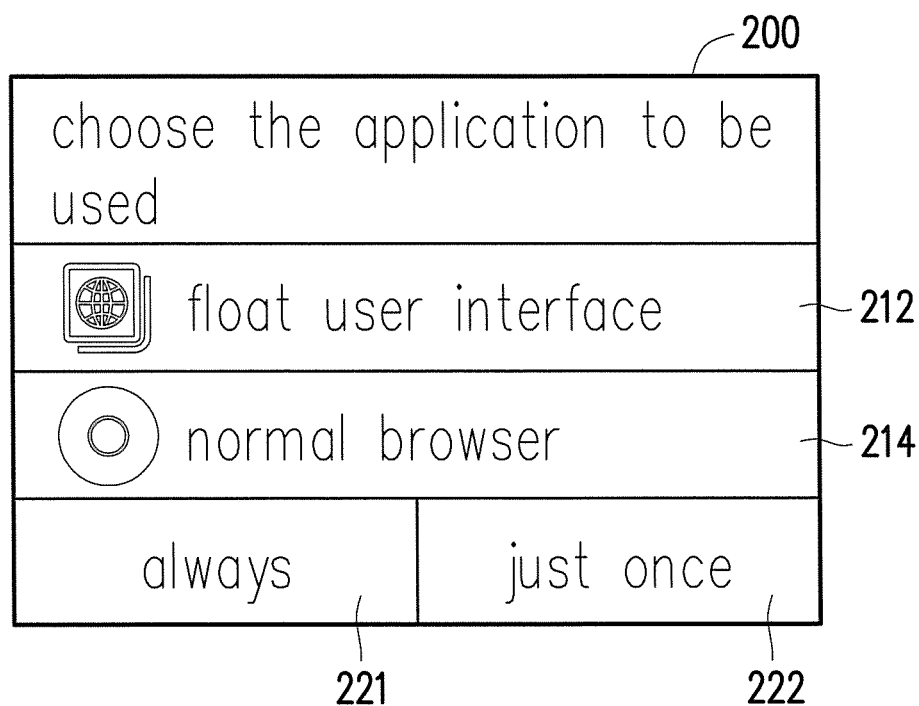
FIG. 2 is a schematic view illustrating an inquiry dialog box when an electronic apparatus starts other applications.

Reference will now be made in detail to the present preferred embodiments of the invention, examples of which are illustrated in the accompanying drawings. Wherever possible, the same reference numbers are used in the drawings and the description to refer to the same or like parts.

Figure 3:
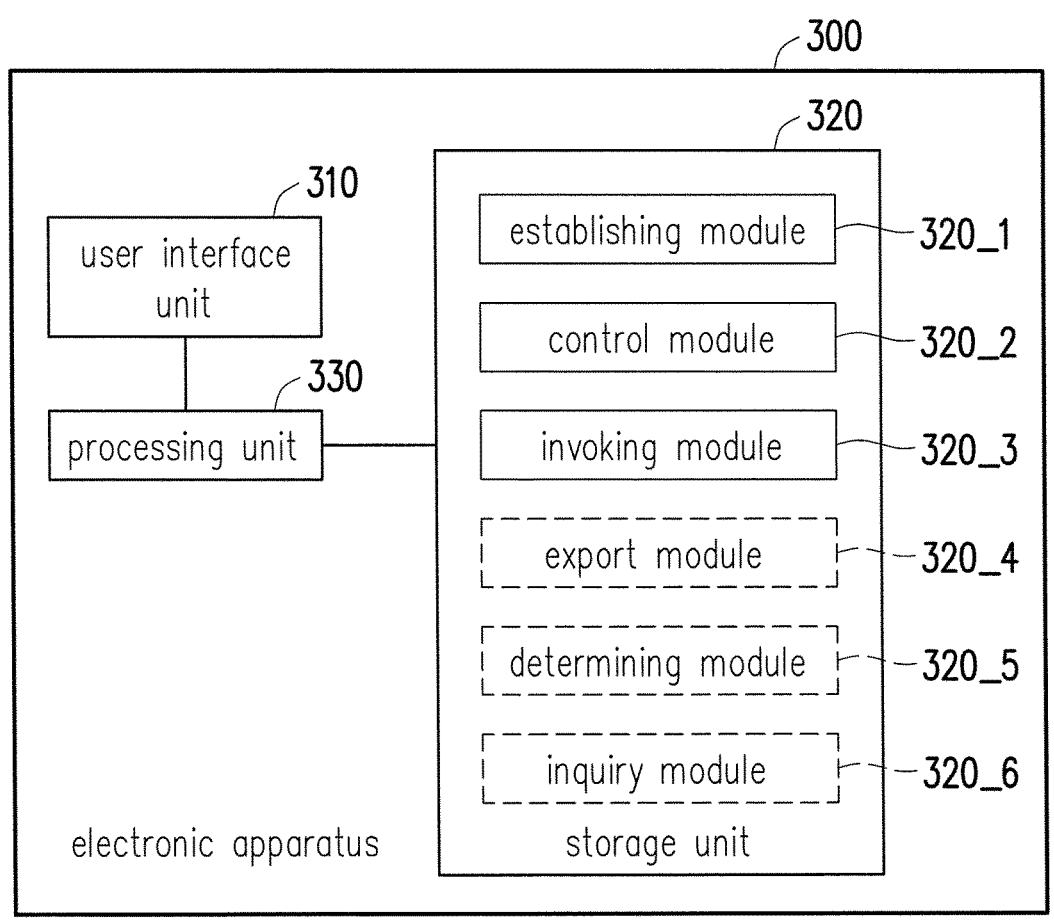
FIG. 3 is a schematic view illustrating an electronic apparatus according to an embodiment of the invention.

FIG. 3 is a schematic view illustrating an electronic apparatus according to an embodiment of the invention. In this embodiment, an electronic apparatus 300 includes a user interface unit 310, a storage unit 320, and a processing unit 330. The electronic apparatus 300 is a smart phone, a tablet computer, a personal digital assistant (PDA), a notebook PC, or other similar apparatuses, for example. The user interface unit 310 is a touch panel, a touch screen, or other components capable of displaying information or allowing the user to input information, for example. The storage unit 320 is a memory, a hard drive, or other components capable of storing data, for example. In addition, the storage unit 320 is configured to record a plurality of modules.

The processing unit 330 is coupled to the user interface unit 310 and the storage unit 320. The processing unit 330 may be a general purpose processor, a special purpose processor, a conventional processor, a digital signal processor, a plurality of microprocessors, one or more microprocessors combined with a digital signal processor core, a controller, a microcontroller, an application specific integrated circuit (ASIC), a field programmable gate array (FPGA) circuit, any other kinds of integrated circuits, state machines, processors based on advanced RISC machine (ARM), or similar components.

In this embodiment, the processing unit 330 may access an establishing module 320_1, a control module 320_2, and an invoking module 320_3 stored in the storage unit 320, so as to carry out respective steps of a method for adaptively invoking applications according to the invention.

Figure 4:
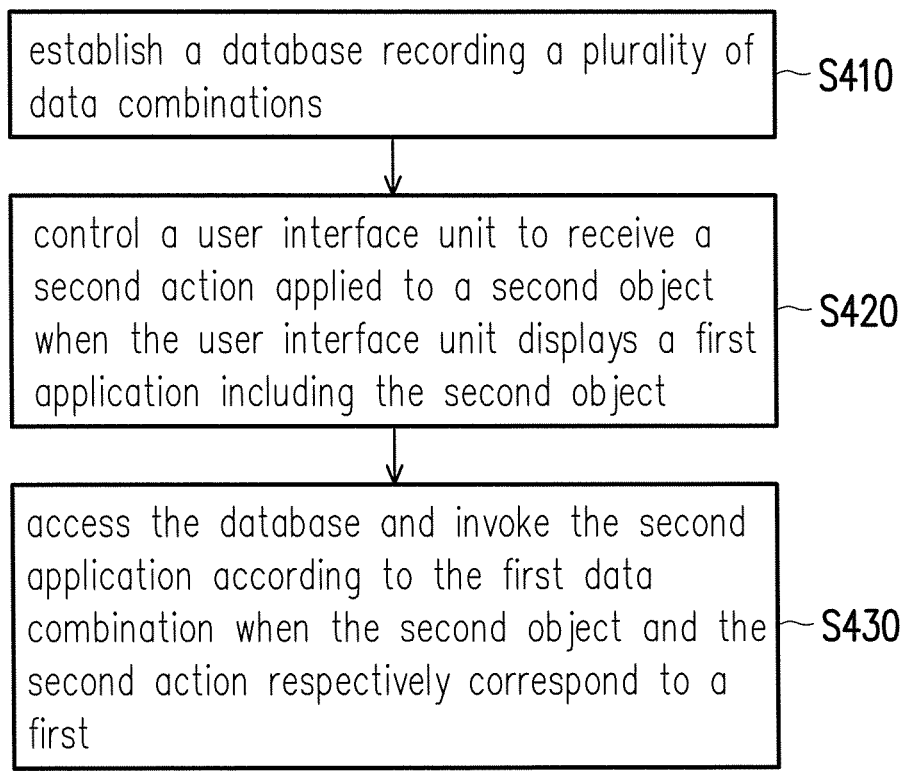
FIG. 4 is a flowchart illustrating a method for adaptively invoking applications according to an embodiment of the invention.

FIG. 4 is a flowchart illustrating a method for adaptively invoking applications according to an embodiment of the invention. The method provided in this embodiment is executable for the electronic apparatus 300 shown in FIG. 3. In the following, steps of the method are described in detail with reference to the components shown in FIG. 3.

At Step S410, the establishing module 320_1 establishes a database recording a plurality of data combinations.

In an embodiment, when the user interface unit 310 displays a first application including a first object and receives a first action applied to the first object, the establishing module 320_1 may display a first inquiry dialog box including a plurality of applications and a plurality of execution options.

Referring to FIGS. 5A to 5C, FIGS. 5A to 5C are schematic views illustrating an electronic apparatus executing applications according to an embodiment of the invention. In this embodiment, when the user applies the first action (e.g., clicking) to a first object 510 in a first application 500, the establishing module 320_1 may display a first inquiry dialog box D1. The first inquiry dialog box D1 includes applications A1 to A2 and execution options B1 to B3. In addition, the execution option B2 is a specific option with contents of "smart choice", as shown in FIG. 5B. A function of the specific option of the invention is to store a type of the first application being executed, the first object, the first action, and a corresponding second application (i.e., one of the applications A1 to A2), so as to establish a database recording user's operating habits.

Assuming that the user chooses the application A1 (i.e., the second application) and the execution option B2, the establishing module 320_1 may add a first data combination to the database and invoke the application A1 to open the first object by using a float user interface 520. The first data combination may correspond to the first application 500, the first object 510, and the application A1 invoked by the electronic apparatus 300 in response to the first action applied to the first object 510 when the user interface unit 310 displays the first application 500 including the first object 510. The first data combination may be exemplarily realized in a form shown in Table 1. However, the embodiments of the invention are not limited thereto.

TABLE 1

| data combination | first application | object | action | second application |
|---|---|---|---|---|
| first data combination | social website | article link | click | float user interface |

For the ease of description, the first application, the first object, and the first action are described as a user's operating scenario. Under such circumstance, each data combination in the database may be regarded as being adapted to record an application (i.e., the second application) invoked by the electronic apparatus 300 in response to the operating scenario. Taking the first data combination in Table 1 as an example, the social website, article link and click is the operating scenario recorded in the first data combination, while the float user interface 520 is the second application invoked by the electronic apparatus 300 in response to the operating scenario.

In other embodiments, the establishing module 320_1 may directly import an extensible markup language (XML) file to establish the database. In other words, the establishing module 320_1 may present the data combinations of the user's habits in an XML file, and the data combinations may be further shared with other electronic apparatuses through media such as a network. Thus, the same database may be used in different electronic apparatuses even if the electronic apparatuses are manufactured by different manufacturers. It is not necessary to set up and re-establish the database of the user's habits again. Besides, in other embodiments, the storage unit 320 may further include an export module 320_4 configured to export the database established by the establishing module 320_1 as the XML file. In this way, other electronic apparatuses may import the XML file to share the database with the electronic apparatus 300. It should be noted that the database of the user's habits may also be output in other file formats, such as other pure text formats, structured query language (SQL) format, MySQL format, etc., for example. The invention is not limited thereto.

Then at Step S420, when the user interface unit 310 displays the first application including a second object, the control module 3202 may control the user interface unit 310 to receive a second action applied to the second object. Then at Step S430, when the second object and the second action respectively correspond to the first object and the first action, the invoking module 3203 may access the database and invoke the second application according to the first data combination.

In other words, after the first data combination shown in Table 1 is added to the database, if the electronic apparatus 300 determines that another operating scenario the same as or similar to the operating scenario recorded in the first data combination occurs, the electronic apparatus 300 may invoke the second application according to the first data combination.

Figure 6B:
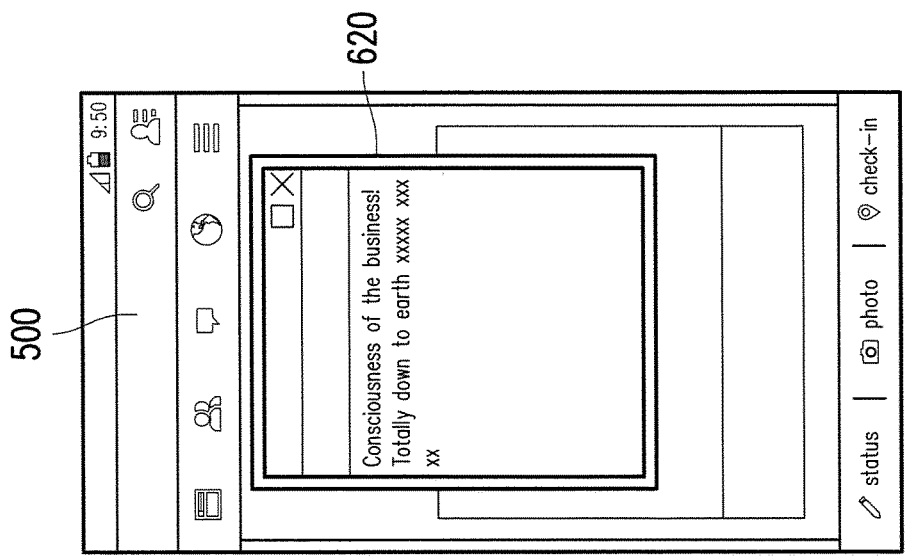
FIGS. 6A to 6B are schematic views illustrating an electronic apparatus executing applications according to an embodiment of the invention.
Figure 6A:
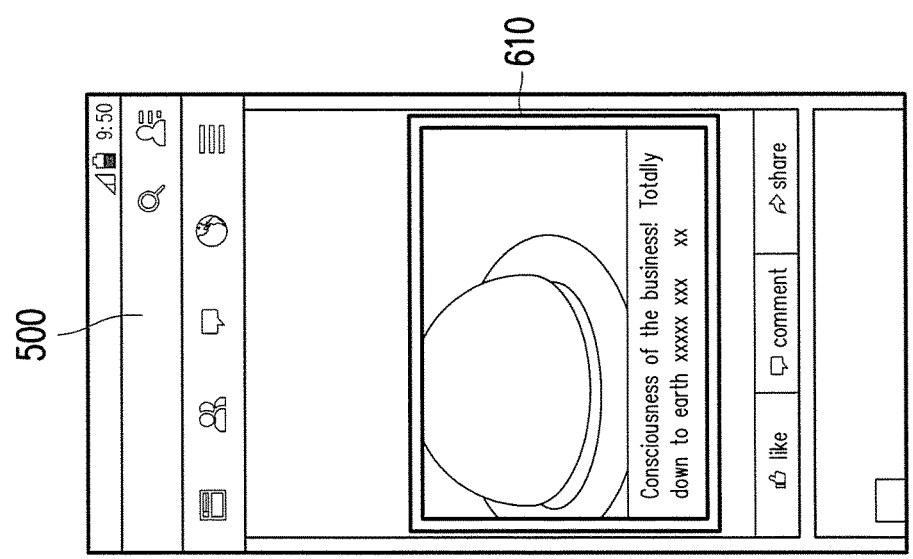

Referring to FIGS. 6A to 6B, FIGS. 6A to 6B are schematic views illustrating an electronic apparatus executing applications according to an embodiment of the invention. In this embodiment, the user interface unit 310 displays the first application 500 including a second object 610, as shown in FIG. 6A. When the user applies the second action (e.g., clicking) to the second object 610 in the first application 500, the control module 320_2 may control the user interface unit 310 to receive the second action applied to the second object 610. When the second object 610 and the second action respectively correspond to the first object 510 and the first action, the invoking module 320_3 may access the database and invoke the second application according to the first data combination. In addition, the first object 510 shown in FIG. 5A and the second object 610 shown in FIG. 6A are both article links. Therefore, the first object 510 and the second object 610 are determined to be objects of the same type. In addition, the first action and the second action received by the objects are both actions of clicking. Based on a result of comparison, the invoking module 320_3 may access the database and invoke the second application according to the first data combination. Thus, as shown in FIG. 6B, a window is started through the second application (i.e., a float user interface 620, as shown in Table 1).

Briefly, since an operating scenario shown in FIG. 6A is similar to the operating scenario in FIG. 5A, the electronic apparatus 300 may invoke the second application (i.e., the float user interface 620) to open the second object 610 (i.e., article link) based on the first data combination shown in Table 1.

In another embodiment, referring to FIGS. 7A to 7C, FIGS. 7A to 7C are schematic views illustrating an electronic apparatus executing applications according to an embodiment of the invention. In this embodiment, the user interface unit 310 displays the first application 500 including a third object 710. Since the database does record an object type of the third object 710, when the user applies a third action (e.g., clicking) to the third object 710 in the first application 500, the establishing module 320_1 may display the first inquiry dialog box D1. Similarly, the first inquiry dialog box D1 may include the applications A1 to A2 and the execution options B1 to B3, as shown in FIG. 7B.

Then, if the user chooses the application A2 (i.e., a normal browser) and the execution option B2, the establishing module 320_1 may add a second data combination to the database (as shown in Table 2), and invoke the application A2 to open the third object 710. The second data combination may correspond to the first application 500, the third object 710, and the application A2 invoked by the electronic apparatus 300 in response to the third action applied to the third object 710 when the user interface unit 310 displays the first application 500 including the third object 710. As shown in FIG. 7C, the application A2 may start a window 720 to display contents of the third object 710.

TABLE 2

| data combination | first application | object | action | second application |
|---|---|---|---|---|
| first data combination | social website | article link | click | float user interface |
| second data combination | social website | video link | click | normal browser |

In other words, when the electronic apparatus 300 finds that the operating scenario shown in FIG. 7A is different from the operating scenario shown in FIG. 5A (i.e., the object types are different), the electronic apparatus 300 may add the second data combination in the database, so as to record the operating scenario of FIG. 7A and the corresponding second application (i.e., the normal browser).

In yet another embodiment, referring to FIGS. 8A to 8B, FIGS. 8A to 8B are schematic views illustrating an electronic apparatus executing applications according to an embodiment of the invention. In this embodiment, the user interface unit 310 displays the first application 500 including a fourth object 810, as shown in FIG. 8A. When the user applies a fourth action (e.g., clicking) to the fourth object 810 in the first application 500, the control module 320_2 may control the user interface unit 310 to receive the fourth action applied to the fourth object 810. When the fourth object 810 and the fourth action respectively correspond to the third object 710 and the third action, the invoking module 3203 may access the database and invoke the second application according to the second data combination. Since the third object 710 shown in FIG. 7A and the fourth object 810 shown in FIG. 8A are both video links, the third object 710 and the fourth object 810 are determined to be objects of the same type. In addition, the third action and the fourth action received by the objects are both actions of clicking. Based on a result of comparison, the invoking module 320_3 may access the database and invoke the second application (i.e., the normal browser, as shown in Table 2) according to the second data combination. Thus, as shown in FIG. 8B, a window 820 is started through the second application.

In another embodiment, referring to FIGS. 9A to 9C, FIGS. 9A to 9C are schematic views illustrating an electronic apparatus executing applications according to an embodiment of the invention. In this embodiment, the user interface unit 310 includes a first application 900 (e.g., a mail application) including a fifth object 910. Since the database does not record an application type of the first application 900, when the user applies a fifth action (e.g., clicking) to the fifth object 910 in the first application 900, the establishing module 320_1 may display the first inquiry dialog box D1 and add a third data combination to the database according to the aforesaid method, as shown in Table 3. The establishing module 320_1 then invokes the chosen application A2 to open the fifth object 910. As shown in FIG. 9C, the application A2 may start a window 920 to display contents of the fifth object 910.

TABLE 3

| data combination | first application | object | action | second application |
|---|---|---|---|---|
| first data combination | social website | article link | click | float user interface |
| second data combination | social website | video link | click | normal browser |
| third data combination | mail application | data link | click | normal browser |

Then, when the user chooses the same type of object and the same action in the first application of the same type, the second application is also invoked to open an object according to the aforesaid method. Thus, details in this regard will not be reiterated below.

In other embodiments, the storage unit 320 may further include a determining module 320_5. When an operating scenario occurs again, the determining module 320_5 may determine whether the operating scenario already occurs for a preset number of times (i.e., a usage amount of a data combination of the operating scenario). If the operating scenario does not occur for the preset number of times yet, the determining module 320_5 may accumulate the number of times that the operating scenario occurs. If the operating scenario already occurs for the preset number of times, the determining module 320_5 may not inquire the user about the application that the user intends to use. Instead, the second application corresponding to the operating scenario is executed according to the data combination. Taking FIG. 9A as an example, assuming that an operating scenario shown in FIG. 9A occurs again, the determining module 320_5 may determine whether a usage amount of the third data combination corresponding to the operating scenario exceeds a preset threshold. The preset threshold may be an arbitrary number of times greater than 1.

The usage amount of the third data combination does not exceed the preset threshold, the establishing module 320_1 may control the user interface unit 310 to display the first inquiry dialog box D1, as shown in FIG. 9B. When the user chooses the application A2 and the specific option B2 again, the establishing module 320_1 may accumulate the usage amount of the third data combination. Then, the invoking module 320_3 may invoke the normal browser to open the object clicked by the user.

Alternatively, when the usage amount of the third data combination exceeds the preset threshold, the user interface unit 310 may not display the first inquiry dialog box D1. Instead, the invoking module 3203 may directly invoke the normal browser to open the object clicked by the user according to the third data combination.

In other embodiments, the storage unit 320 may further include an inquiry module 3206, as shown in FIG. 3. In this embodiment, after the establishing module 320_1 records the current operating scenario and the invoked second application in response to the user's choice in the first inquiry dialog box, the inquiry module 320_6 may further display a second inquiry dialog box to inquire whether the chosen second application is always invoked when the operating scenario occurs hereinafter.

Figure 10A:
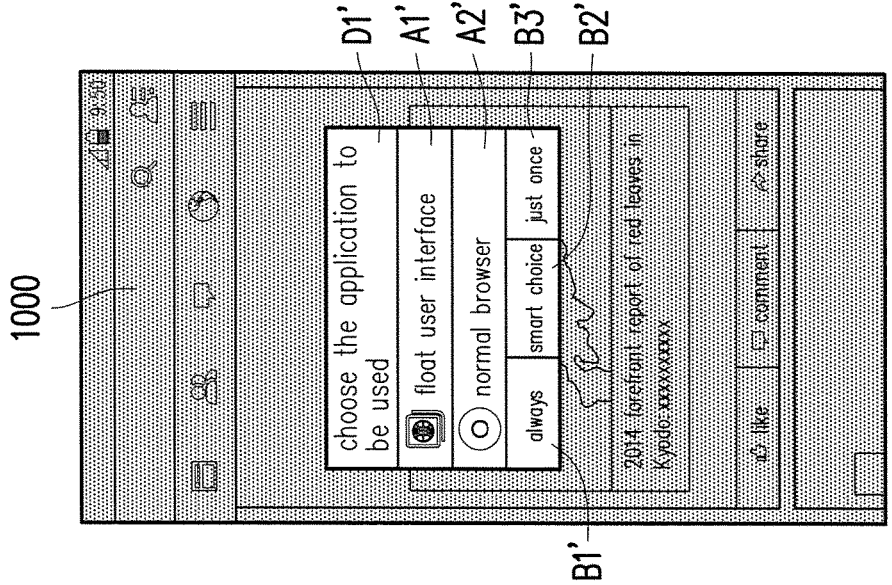
FIGS. 10A to 10D are schematic views illustrating an electronic apparatus executing applications according to an embodiment of the invention.
Figure 10B:
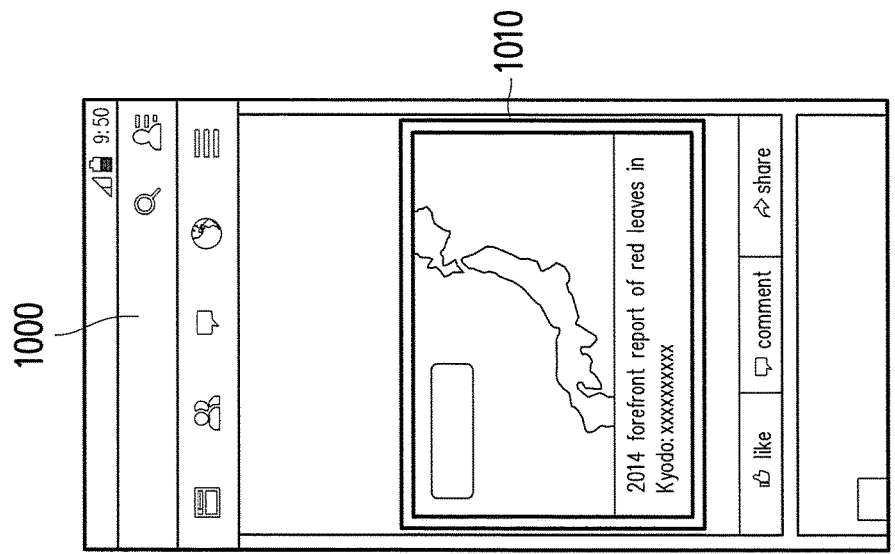
Figure 10D:
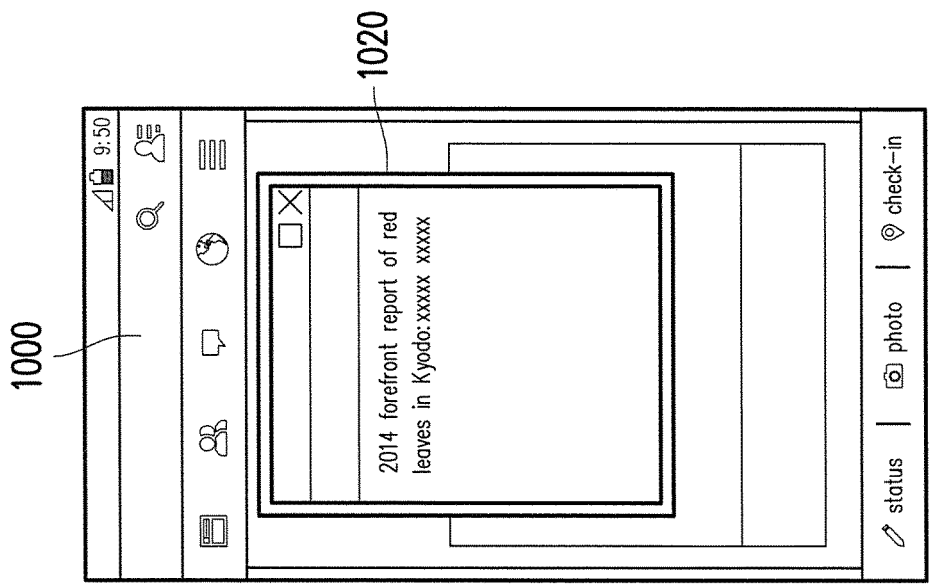
Figure 10C:
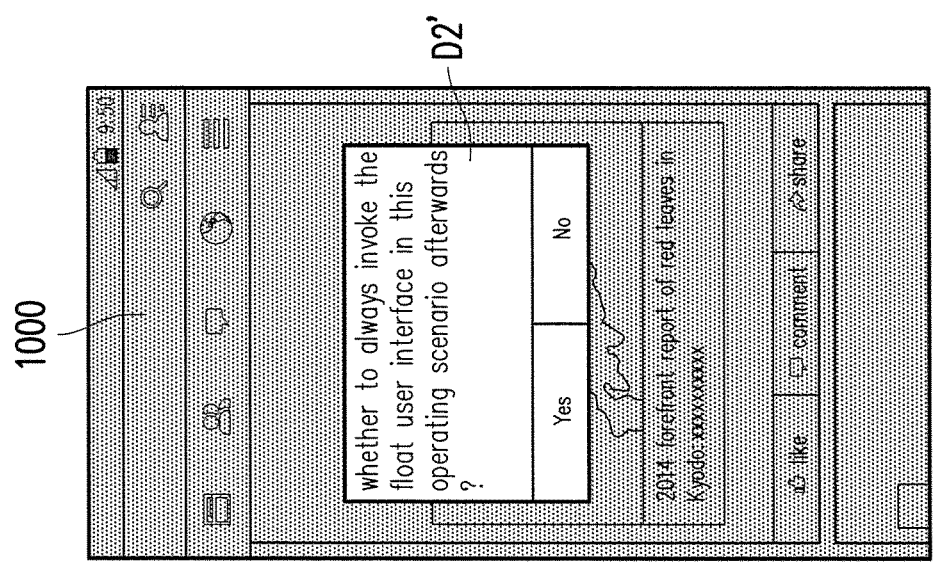

FIGS. 10A to 10D are schematic views illustrating an electronic apparatus executing applications according to an embodiment of the invention. In this embodiment, when the user interface unit 310 displays a first application 1000 including an object 1010 (as shown in FIG. 10A) and receives an action applied to the object 1010, in addition to displaying a first inquiry dialog box DP (as shown in FIG. 10B) including applications A1' to A2' and execution options B1' to B3', after the application A1' (i.e., a float user interface 1020) and the execution option B2 are chosen, the inquiry module 320_6 may display a second inquiry dialog box D2' (as shown in FIG. 10C) to inquire the user whether the float user interface 1020 is always invoked when the operating scenario occurs hereinafter. If the user chooses an option "Yes", when an operating scenario similar to the operating scenario shown in FIG. 10A occurs again, the invoking module 320_3 may directly invokes the float user interface 1020, and no inquiry dialog box is displayed. Alternatively, if the user chooses an option "No", when the operating scenario similar to the operating scenario shown in FIG. 10A occurs again, the electronic apparatus may operate according to a mechanism similar to the mechanism shown in FIGS. 10B to 10D, and details in this respect will not be reiterated again.

People having ordinary skills in the art shall understand that the applications, objects, and actions used in the embodiments are merely examples, and are not used to limit the embodiments of the invention. In other words, the type of the first application is not limited to the social website and the mail application used in the previous embodiments, and the type of the second application is not limited to the float user interface and the normal browser.

In other embodiments, since there may be several applications of the same type stored in a conventional electronic apparatus, the electronic apparatus may also record the second applications used by the user in different operating scenarios according to the method provided in the embodiments of the invention.

Figure 11:
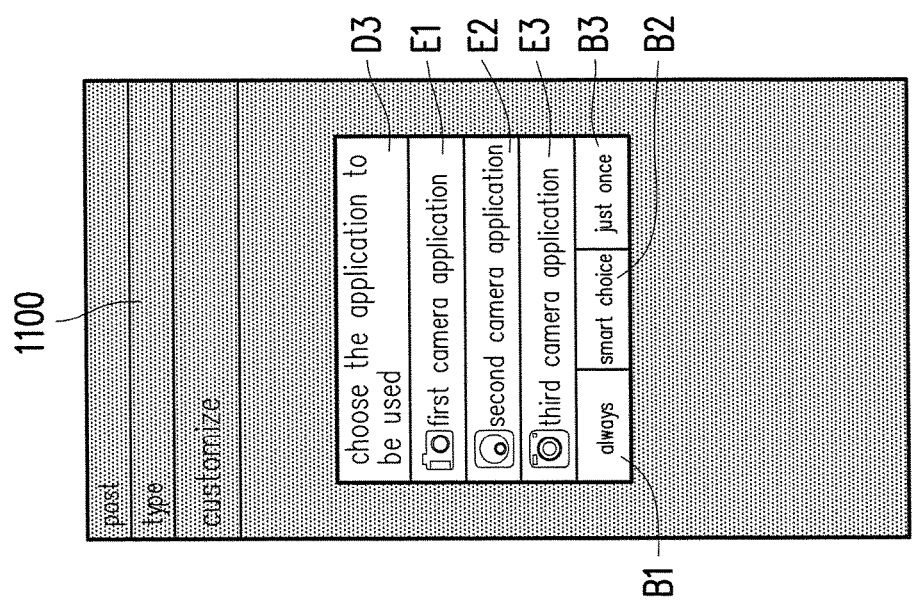
FIG. 11 is a schematic view illustrating an electronic apparatus intending to executing applications according to an embodiment of the invention.

Taking FIG. 11 as an example, FIG. 11 is a schematic view illustrating an electronic apparatus intending to executing applications according to an embodiment of the invention. In this embodiment, assuming that a first application 110 is an article editing application having a function of uploading a picture that is captured, when the user clicks a "shoot" button in the first application 1100, for example, the electronic apparatus 300 may display an inquiry dialog box D3 for the user's choice. The inquiry dialog box D3 may include applications E1 to E3 and execution options B1 to B3. The applications E1 to E3 may respectively correspond to different camera applications. The execution option B2 is the specific option in the embodiments. Thus, the user may establish the database by using the execution option B2 to record the second application used by the user in this operating scenario. Accordingly, when the operating scenario shown in FIG. 11 occurs again, the electronic apparatus 300 is able to invoke the suitable second application according to the database, thereby improving the user's experience.

In view of the foregoing, the method for adaptively invoking the applications and the electronic apparatus using the same according to the embodiments of the invention are capable of establishing the data combinations corresponding to different operating scenarios in the database and recording the second applications that the user intends to use in the respective operating scenarios. In this way, when the operating scenarios occur again, the electronic apparatus may automatically select the suitable second applications according to the database. From another perspective, the user is no longer limited to conventional options such as "only once" and "always" when choosing the application the user intends to use. Thus, the user is able to make a more intuitive and smart choice.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adaptively invoking applications, adapted for an electronic apparatus having a user interface unit, the method comprising:
    establishing a database recording a plurality of data combinations, wherein a first data combination of the data combinations corresponds to a first application, a first object, and a second application invoked by the electronic apparatus in response to a first action applied to the first object comprised in the first application displayed on the user interface unit, comprising:
    displaying, by the user interface unit, a first inquiry dialog box comprising the second application in response to the user interface unit receiving the first action applied to the first object comprised in the first application; and
    adding the first data combination to the database in response to the second application being chosen;
    displaying, by the user interface unit, the first application comprising a second object, and controlling the user interface unit to receive a second action applied to the second object; and
    accessing the database and invoking the second application according to the first data combination in response to the second object being the same object type with the first object and the second action being the same action with the first action; and
    adding, to the database, a second data combination in response to the second object being not the same object type with the first object, wherein the second data combination comprises the first application, the second object, and another second application chosen on the first inquiry box in response to the second action being received.

2. The method as claimed in claim 1, wherein the step of establishing the database recording the data combinations comprises:
    displaying the first inquiry dialog box comprising a plurality of applications and a plurality of execution options in response to the user interface unit receiving the first action applied to the first object when displaying the first application comprising the first object, wherein the execution options comprise a specific option, and the applications comprise the second application; and
    when the second application and the specific option are chosen, adding the first data combination to the database.

3. The method as claimed in claim 2, wherein before the step that the first data combination invokes the second application, the method further comprises:
    determining whether a usage amount of the first data combination exceeds a preset threshold;
    if the usage amount does not exceed the preset threshold, displaying the first inquiry dialog box, and accumulating the usage amount of the first data combination when the second application and the specific option are chosen; and
    if the usage amount exceeds the preset threshold, directly invoking the second application without displaying the first inquiry dialog box.

4. The method as claimed in claim 2, wherein after the step of adding the first data combination to the database, the method further comprises:
    displaying a second inquiry dialog box, wherein the second inquiry dialog box is adapted to inquire whether the second application is always invoked if the first action applied to the first object is received when the first application comprising the first object is displayed hereinafter.

5. The method as claimed in claim 1, further comprising:
    exporting the database as an extensible markup language file.

6. The method as claimed in claim 1, wherein the step of establishing the database recording the data combinations comprises:
    importing an extensible markup language file comprising the data combinations.

7. The method as claimed in claim 1, wherein the first object and the second object are of the same object type.

8. An electronic apparatus, comprising:
    a user interface unit;
    a storage unit, storing a plurality of modules; and
    a processing unit, coupled to the user interface unit and the storage unit, accessing and executing the modules stored in the storage unit, wherein the modules comprise:
    an establishing module, establishing a database recording a plurality of data combinations, wherein a first data combination of the data combinations corresponds to a first application, a first object, and a second application invoked by the electronic apparatus in response to a first action applied to the first object comprised in the first application displayed on the user interface unit, wherein the user interface unit displays a first inquiry dialog box comprising the second application in response to the user interface unit receiving the first action applied to the first object comprised in the first application; and the establishing module adds the first data combination to the database in response to the second application being chosen;
    a control module, controlling the user interface unit to receive a second action applied to the second object when the user interface unit displays the first application comprising a second object; and
    an invoking module, accessing the database and invoking the second application according to the first data combination in response to the second object being the same type with the first object and the second action being the same action with the first action; and the establishing module adding a second data combination to the database in response to the second object being not the same object type with the first object, wherein the second data combination comprises the first application, the second object, and another second application chosen on the first inquiry box in response to the second action being received.

9. The electronic apparatus as claimed in claim 8, wherein establishing module is configured to:

display the first inquiry dialog box comprising a plurality of applications and a plurality of execution options in response to the user interface unit receiving the first action applied to the first object when displaying the first application comprising the first object, wherein the execution options comprise a specific option, and the applications comprise the second application; and when the second application and the specific option are chosen, add the first data combination to the database.

10. The electronic apparatus as claimed in claim 9, wherein the modules further comprise a determining module, and the determining module is configured to:

determine whether a usage amount of the first data combination exceeds a preset threshold;

if the usage amount does not exceed the preset threshold, control the user interface unit to display the first inquiry dialog box, and accumulate the usage amount of the first data combination when the second application and the specific option are chosen; and if the usage amount exceeds the preset threshold, control the user interface unit to directly invoke the second application without displaying the first inquiry dialog box.

11. The electronic apparatus as claimed in claim 9, wherein the modules further comprise an inquiry module, and the inquiry module is configured to:

display a second inquiry dialog box, wherein the second inquiry dialog box is adapted to inquire whether the second application is always invoked if the first action applied to the first object is received when the first application comprising the first object is displayed hereinafter.

12. The electronic apparatus as claimed in claim 8, wherein the modules further comprise an exporting module configured to export the database as an extensible markup language file.

13. The electronic apparatus as claimed in claim 8, wherein the establishing module imports an extensible markup language file comprising the data combinations to establish the database.

14. The electronic apparatus as claimed in claim 8, wherein the first object and the second object are of the same object type.

* * * * *